(12) United States Patent
Duran et al.

(10) Patent No.: US 8,596,094 B2
(45) Date of Patent: Dec. 3, 2013

(54) SYNTHETIC SILICA GLASS WITH UNIFORM FICTIVE TEMPERATURE

(75) Inventors: Carlos Duran, Ottawa (CA); Kenneth Edward Hrdina, Horseheads, NY (US); Ulrich Wilhelm Heinz Neukirch, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 329 days.

(21) Appl. No.: 12/902,238

(22) Filed: Oct. 12, 2010

(65) Prior Publication Data

US 2011/0092354 A1 Apr. 21, 2011

Related U.S. Application Data

(60) Provisional application No. 61/253,644, filed on Oct. 21, 2009.

(51) Int. Cl.
| | |
|---|---|
| C03B 13/00 | (2006.01) |
| C03B 15/00 | (2006.01) |
| C03B 19/00 | (2006.01) |
| C03B 25/00 | (2006.01) |
| C03C 3/06 | (2006.01) |

(52) U.S. Cl.
USPC .................. 65/95; 65/117; 501/53; 501/54

(58) Field of Classification Search
USPC ............... 501/53, 54; 65/95, 104, 117–119
See application file for complete search history.

(56) References Cited

U.S. PATENT DOCUMENTS

| | | | | | |
|---|---|---|---|---|---|
| 7,294,595 | B2* | 11/2007 | Iwahashi et al. | ........... | 501/54 |
| 7,501,367 | B2* | 3/2009 | Kuehn et al. | ........... | 501/54 |
| 7,506,522 | B2* | 3/2009 | Bleaking et al. | ........... | 65/17.3 |
| 8,093,165 | B2* | 1/2012 | Koike et al. | ........... | 501/54 |
| 2006/0234848 | A1* | 10/2006 | Kuehn et al. | ........... | 501/54 |
| 2007/0105704 | A1* | 5/2007 | Bookbinder et al. | ........... | 501/54 |

FOREIGN PATENT DOCUMENTS

WO     2008140676 A2   11/2008

OTHER PUBLICATIONS

U.S. Appl. No. 61/141,924, filed Dec. 31, 2008, Duran, Carlos et al.

* cited by examiner

*Primary Examiner* — Noah Wiese

(74) *Attorney, Agent, or Firm* — Robert P. Santandrea

(57) ABSTRACT

A method of making a silica glass having a uniform fictive temperature. The glass article is heated at a target fictive temperature, or heated or cooled at a rate that is less than the rate of change of the fictive temperature, for a time that is sufficient to allow the fictive temperature of the glass to come within 3° C. of the target fictive temperature. The silica glass is then cooled from the target fictive temperature to a temperature below the strain point of the glass at a cooling rate that is greater than the relaxation rate of the glass at the target fictive temperature. The silica glass has a fictive temperature that varies by less than 3° C. after the annealing step. A silica glass made by the method is also described.

53 Claims, 8 Drawing Sheets

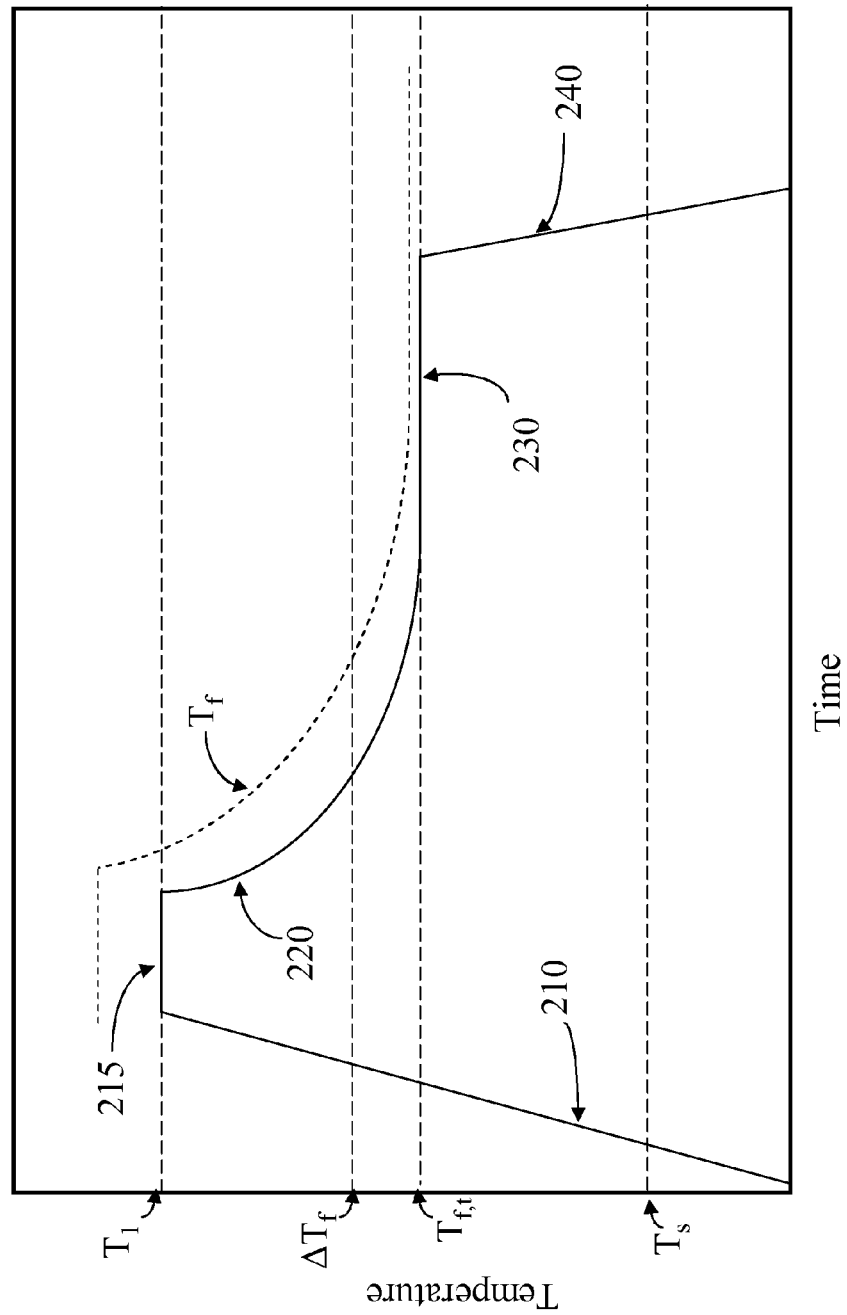

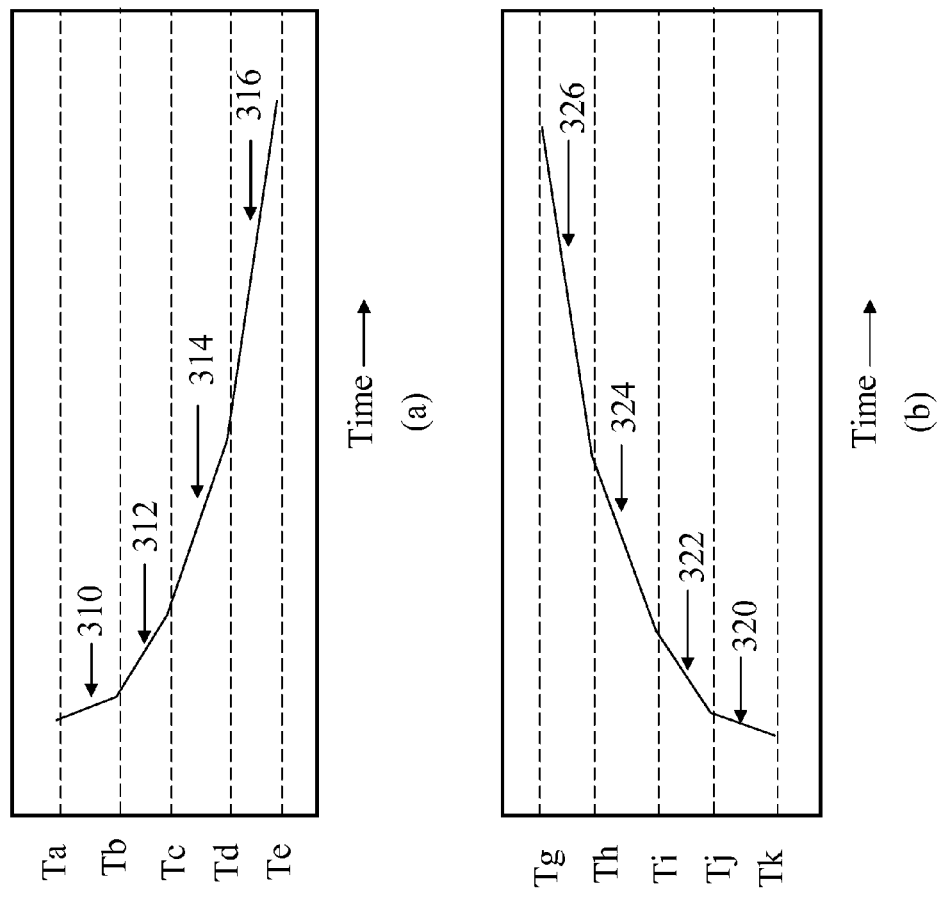

SYNTHETIC SILICA GLASS WITH UNIFORM FICTIVE TEMPERATURE

CROSS-REFERENCE TO RELATED APPLICATIONS

This application claims the benefit of priority under 35 U.S.C. §119(e) of U.S. Provisional Application Ser. No. 61/253,644, filed on Oct. 21, 2009.

BACKGROUND

Standard processes for making synthetic fused silica utilize careful control of composition of the glass. For example, the distribution of modifiers such as hydroxyl (OH), sodium, and the like in the glass is controlled during manufacture, with the goal of achieving a homogenous distribution of these species throughout the resulting glass article. Nonetheless, such standard processes frequently yield glasses having variations in refractive index and birefringence.

SUMMARY

A method of making a silica glass having a uniform fictive temperature is provided. The glass article is heated at a target fictive temperature, or heated or cooled at a rate that is less than the rate of change of the fictive temperature, for a time that is sufficient to allow the fictive temperature of the glass to come within 3° C. of the target fictive temperature. The silica glass is then cooled from the target fictive temperature to a temperature below the strain point of the glass at a cooling rate that is greater than the relaxation rate of the glass at the target fictive temperature. The silica glass has a fictive temperature that varies by less than 3° C. after annealing. A silica glass made by the method is also described.

Accordingly, one aspect of the disclosure is to provide a method of making a silica glass having a uniform fictive temperature. The method comprises the steps of providing the silica glass and annealing the silica glass, wherein the fictive temperature of the silica glass varies by less than 3° C. after the annealing step. The silica glass has a hydroxyl group concentration of up to 800 ppm by weight. Annealing the silica glass comprises one of: 1) holding the silica glass at the target fictive temperature for a time sufficient for the fictive temperature of the silica glass to come within 3° C. of the target fictive temperature; and 2) heating or cooling the silica glass at a rate that is less than the rate of change of the fictive temperature for a time sufficient for the fictive temperature of the silica glass to come within 3° C. of a target fictive temperature; and cooling the silica glass from the target fictive temperature to a temperature below the strain point of the glass at a cooling rate that is greater than the relaxation rate of the glass at the target fictive temperature.

A second aspect of the disclosure is to provide a silica glass having an index homogeneity of less than 1 ppm, wherein the silica glass has a fictive temperature that varies by less than 3° C.

A third aspect of the disclosure is to provide a method of obtaining a uniform fictive temperature in a silica glass. The method comprises the steps of: providing the silica glass, the silica glass having a strain point $T_s$ and a fictive temperature; and annealing the silica glass, wherein the fictive temperature of the glass varies by less than 3° C. after the annealing step is less than 3° C. Annealing the silica glass comprises one of: 1) holding the silica glass at the target fictive temperature for a time sufficient for the fictive temperature of the silica glass to come within 3° C. of the target fictive temperature; and 2) heating or cooling the silica glass at a rate that is less than the rate of change of the fictive temperature for a time sufficient for the fictive temperature of the silica glass to come within 3° C. of a target fictive temperature; and cooling the silica glass from the target fictive temperature to a temperature below the strain point at a cooling rate that is greater than the relaxation rate of the glass at the target fictive temperature.

A fourth aspect of the disclosure is to provide a method of annealing a silica glass. The method comprises the steps of: providing the silica glass, the silica glass having a strain point $T_s$ and a fictive temperature; and annealing the silica glass, wherein the fictive temperature varies by less than 3° C. after the annealing step is less than 3° C. from the target fictive temperature. Annealing the silica glass comprises one of: 1) holding the silica glass at the target fictive temperature for a time sufficient for the fictive temperature of the silica glass to come within 3° C. of the target fictive temperature; and 2) heating or cooling the silica glass at a rate that is less than the rate of change of the fictive temperature for a time sufficient for the fictive temperature of the silica glass to come within 3° C. of a target fictive temperature; and cooling the silica glass from the target fictive temperature to a temperature below the strain point at a cooling rate that is greater than the relaxation rate of the glass at the target fictive temperature.

These and other aspects, advantages, and salient features will become apparent from the following detailed description, the accompanying drawings, and the appended claims.

BRIEF DESCRIPTION OF THE DRAWINGS

FIG. 2a is a schematic representation of a second annealing schedule for silica glass;

FIG. 3a is a schematic representation of a progressively decreasing cooling rate;

FIG. 3b is a schematic representation of a progressively decreasing heating rate;

DETAILED DESCRIPTION

Figure 1A:
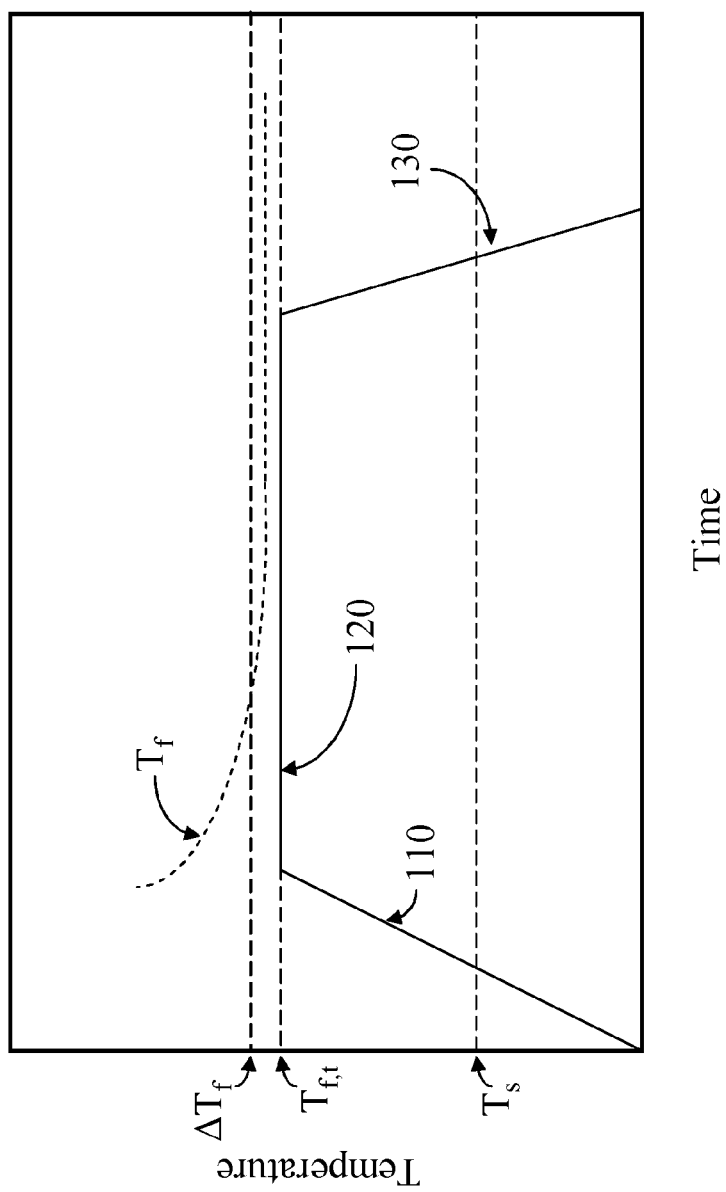
FIG. 1a is a schematic representation of an annealing schedule for silica glass that includes an isothermal hold.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever an element or group is described as comprising at least one of a group of elements and combinations thereof, it is understood that the element or group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general, it will be understood that the illustrations are for the purpose of describing particular embodiments and are not intended to limit the disclosure or appended claims thereto. The drawings are not necessarily to scale, and certain features and views of the drawings may be shown exaggerated in scale or in schematic in the interest of clarity and conciseness.

As used herein, the term "hydroxyl" refers to the diatomic species, either individually or any collection, mixture, or assembly thereof, that consists of one oxygen atom and one atom of any of the isotopes of hydrogen (protium, deuterium, tritium), unless otherwise specified. Such hydrogen isotopes can be present in concentrations that are greater than, equal to, or less than their respective natural isotopic abundances. As used herein, the term "OH," unless otherwise specified, refers to the species consisting of one oxygen atom and one hydrogen atom, wherein the oxygen and hydrogen isotopes are present in their natural isotopic abundances. The naturally occurring distribution of hydrogen isotopes is approximately 99.98% protium (hydrogen nucleus consisting of one proton) and 0.02% deuterium (hydrogen nucleus consisting of one proton and one neutron). Unless otherwise specified, the term "OD" refers to the deuteroxyl species consisting of one oxygen atom and one deuterium atom. By way of example, a concentration of 1000 ppm OH would consist of approximately 998 ppm protium-containing hydroxyl species and about 2 ppm OD, or deuterium, -containing hydroxyl species.

Any element other than hydrogen (e.g., Si, O, Na), when referred to herein, is present in its naturally occurring mixture of isotopes, unless otherwise specified.

Unless otherwise specified, the terms "glass" and "silica glass" as used herein refer to synthetic fused silica glass and articles made therefrom. The synthetic fused silica glass, unless otherwise specified, is substantially free of actively added dopants such as, but not limited to, halogens (e.g., chlorine or fluorine) and, in one embodiment, consists essentially of silica, hydrogen, sodium, and hydroxyl groups.

Standard processes for making synthetic fused silica utilize careful control of composition of the fused silica glass. For example, the distribution of modifiers such as hydroxyl groups, sodium, and the like in the glass is controlled during manufacture, with the goal of achieving a homogenous distribution of these species throughout the resulting glass article, such as, for example, an optical component for projection and illumination optics in lithographic systems. Nonetheless, such standard processes frequently yield glasses having variations in refractive index and birefringence.

Differences or inhomogeneities in properties such as refractive index—or absolute refractive index (ART)—and birefringence are also driven in part by structural differences within the glass. Modifiers such as those mentioned above have little direct influence on the index of refraction because the amounts of modifier added (e.g., 1-300 ppm OH, <25 ppb Na) are relatively small. However, these modifiers have an indirect effect on structure by terminating the —O—Si—O— bonds, thereby lowering the viscosity of the glass. Decreased viscosity results in changes in the final fictive temperature of the glass. The fictive temperature is directly related to—and is a measure of—the structure of the glass.

The influence of these modifiers on refractive index (index) can be divided into two categories: a first category in which the modifier directly affects the index by the inherent change in electron cloud density caused by the presence of the modifier; and a second category in which the modifier indirectly influences index by changing the structure of the glass.

The magnitude of the direct and indirect contributions of the individual modifiers on the index varies as a function of modifier concentration in the glass. The impact of OH concentration on index, for example, decreases with increasing OH concentration. At high OH concentrations, the direct contribution of OH to the refractive index is large while the indirect structural contribution to the index is small. For example, at 700 ppm OH, the OH concentration must change by about 25 ppm to effect a 1 ppm index change and asymptotically continues at this 25:1 ratio to OH concentrations of up to 1000 ppm.

The indirect structural contribution of OH has been observed to increase with decreasing OH concentration. At 60 ppm OH, 5 ppm OH are required to change the index by 1 ppm, whereas at 1-2 ppm OH, a 1 ppm index change is effected by a change in OH concentration of only 2-3 ppm. The impact of OH concentration on at these lower concentration levels is primarily structural in nature; i.e., the indirect contribution of OH to the index dominates. While such behavior has been reported for concentrations of hydroxyl groups comprising the naturally occurring abundances hydrogen isotopes, mixtures of hydroxyl groups that are enriched in a particular hydrogen isotope (e.g., deuterium, present as deuteroxyl (OD)) are expected to exhibit similar behavior.

The impact of sodium upon refractive index is primarily structural in nature. The effect of sodium concentration on both the index and structure of the glass is directly proportional to the fictive temperature ($T_f$) of the glass. Data show that a 1 ppb increase in sodium concentration lowers the fictive temperature of the glass and increases the refractive index by 2.7 ppm and 1.4 ppm in the glasses containing 1 ppm OD and 60 ppm OH, respectively. At sodium levels in the 1-100 ppb range, the inherent or direct contribution of sodium upon the refractive index is negligible and the indirect structural impact of sodium accounts for 99% of the effect of sodium on the index.

Accordingly, a synthetic fused silica glass and articles made therefrom are described and provided herein. The glass is isostructural, as evidenced by a low variation in fictive temperature $T_f$, or uniform fictive temperature, of the glass. The fictive temperature is directly related to—and is a measure of—the structure of the glass, which is fundamentally determined by the statistical distribution of angles of the —Si—O—Si— chemical bonds. An ideal isostructural glass presents the same statistical bond angle distribution throughout the whole extension of the article, and is thus characterized by a fictive temperature that is independent of position within the article. In an actual glass, the degree of variation of fictive temperature is therefore a direct measure of how close the glass is to an ideal isostructural glass. Methods of making such a synthetic fused silica glass, providing a synthetic fused silica glass with a uniform fictive temperature, and annealing a silica glass are also provided.

In one embodiment, a synthetic fused silica glass and an article formed from the glass are provided. The glass is isostructural, having a uniform fictive temperature throughout. In one embodiment, the fictive temperature of the glass varies by less than 3° C. In another embodiment, the fictive temperature varies by less than 2° C. and, in yet another embodiment, $T_f$ varies by less than 1° C. The silica glass has a uniform fictive temperature $T_f$ which, in one embodiment, is less than 1050° C.

In addition, the glass article exhibits high refractive index homogeneity and low birefringence, even in those instances where compositional variations that ordinarily give rise to variations in structure and homogeneity are present in the glass. The glass has an index homogeneity of less than 3 ppm. In one embodiment, the index homogeneity is less than 1 ppm. In a particular embodiment, the axis-1 (the axis along the optical path through the article) index homogeneity is less than 1 ppm. The silica glass has a hydroxyl group concentration of less than about 800 ppm and a sodium concentration of up to about 25 ppb. In one embodiment, the hydroxyl group concentration is less than about 300 ppm. In another embodiment, the hydroxyl group concentration is less than about 100 ppm and, in a fourth embodiment, the hydroxyl group concentration is less than 5 ppm. The variation in hydroxyl group concentration in one embodiment is at least 0.5 ppm. As previously described herein, the hydroxyl concentration includes any species consisting of one oxygen atom and one atom of any of the isotopes of hydrogen (protium, deuterium, tritium). In some embodiments, for example, the hydroxyl concentration comprises a concentration of deuteroxyl (OD) groups that is greater than the naturally occurring concentration of deuterium (about 0.02%).

The isostructural silica glass has a low birefringence, even in those instances where compositional variations that ordinarily give rise to structural variations are present in the glass. In one embodiment, the glass has a birefringence of less than 3 ppm/cm. In another embodiment, the glass has a birefringence of less than 1 cm/nm.

The silica glass has an absolute refractive index (ARI; i.e., the refractive index in vacuum) of less than 1.540840 at a wavelength of 193.368 nm and a temperature of 22° C. In one embodiment, the silica glass has an ARI of less than 1.560830 at a wavelength of 193.368 nm and a temperature of 22° C.

A method of making a silica glass that is in an isostructural state is also provided. The isostructural state is reflected in the variation or uniformity of the fictive temperature.

In a first step, a synthetic fused silica glass is provided. The synthetic fused silica glass is typically formed by vapor deposition methods known in the art. In one embodiment, the synthetic silica glass is formed by direct deposition of silica glass on a substrate such as, for example, a glass mandrel. In another embodiment, the synthetic fused silica glass is formed by depositing silica soot on a substrate and subsequently sintering or consolidating the deposited soot to form silica glass. In one embodiment, the silica glass can then be mechanically and thermally worked by those means known in the art to form the silica glass.

The silica glass has a hydroxyl group concentration (hydroxyl concentration) of up to about 800 ppm by weight. The hydroxyl concentration comprises the concentrations of hydroxyl groups containing any of the hydrogen isotopes (protium, deuterium, tritium). This includes the naturally occurring mixture of hydroxyl groups that contain either protium or deuterium containing (approximately 99.98% OH and 0.002% OD, where H and D represent protium and deuterium, respectively) as well as mixtures that are "enriched (contain a proportion of an isotope that is greater than its naturally occurring isotopic abundance)," for example, with deuterium, which is present as OD. In one embodiment, the hydroxyl concentration is less than about 300 ppm. In other embodiments, the hydroxyl concentration is less than about 100 ppm, or less than about 5 ppm. The variation in hydroxyl concentration is, in one embodiment, at least 0.5 ppm, as determined from PV, or peak-to-valley (i.e., difference between maximum and minimum concentrations), measurements of the concentration.

In one embodiment, the synthetic silica glass is annealed by first heating the glass to a desired or target fictive temperature. The annealing schedule is schematically shown in FIG. 1a, in which the glass temperature is plotted as a function of time. In step 110, the glass is heated to a desired temperature that is either at or near a target fictive temperature $T_{f,t}$. In one embodiment, the desired temperature is within 5° C. to 20° C. of the target fictive temperature $T_{f,t}$. The glass is heated at a rate so as to reach the desired temperature as soon as possible without "overshooting" or exceeding the target fictive temperature $T_{f,t}$. In one embodiment, the heating rate in step 110 is in a range from about 1° C./hr up to about 50° C./hr. In another embodiment, the glass is initially heated in step 110 at a fast rate followed by heating at a slower rate so as to approach the target fictive temperature without overshooting.

The glass, in one embodiment, is subjected to an isothermal hold period 120 at the target fictive temperature $T_{f,t}$. The isothermal hold period 120 is a time period that is sufficiently long so as to allow the fictive temperatures $T_f$ of all glass volumes within the glass article to converge on the target fictive temperature $T_{f,t}$ and the isostructural state to be achieved, regardless of the local concentration of glass modifiers. In one embodiment, isothermal hold period 120 is sufficiently long so as to allow the fictive temperature to reach the target fictive temperature. In other embodiments, the fictive temperature $T_f$ varies from $T_{f,t}$ by $\Delta T_f$. In one embodiment, the fictive temperature of the glass varies from $T_{f,t}$ by less than 3° C. In another embodiment the fictive temperature of the glass varies from $T_{f,t}$ by less than 2° C. and, in a third embodiment, the fictive temperature varies from $T_{f,t}$ by less than 1° C. The length of the isothermal hold is determined based on the desired degree of structural homogeneity, the initial variation or "spread" of fictive temperatures in the glass article, the variations in local concentrations of modifiers, and the previous thermal history of the glass article. In one embodiment, the isothermal hold period 120 is in a range from about 10 hours up to about 800 hours.

Figure 1B:
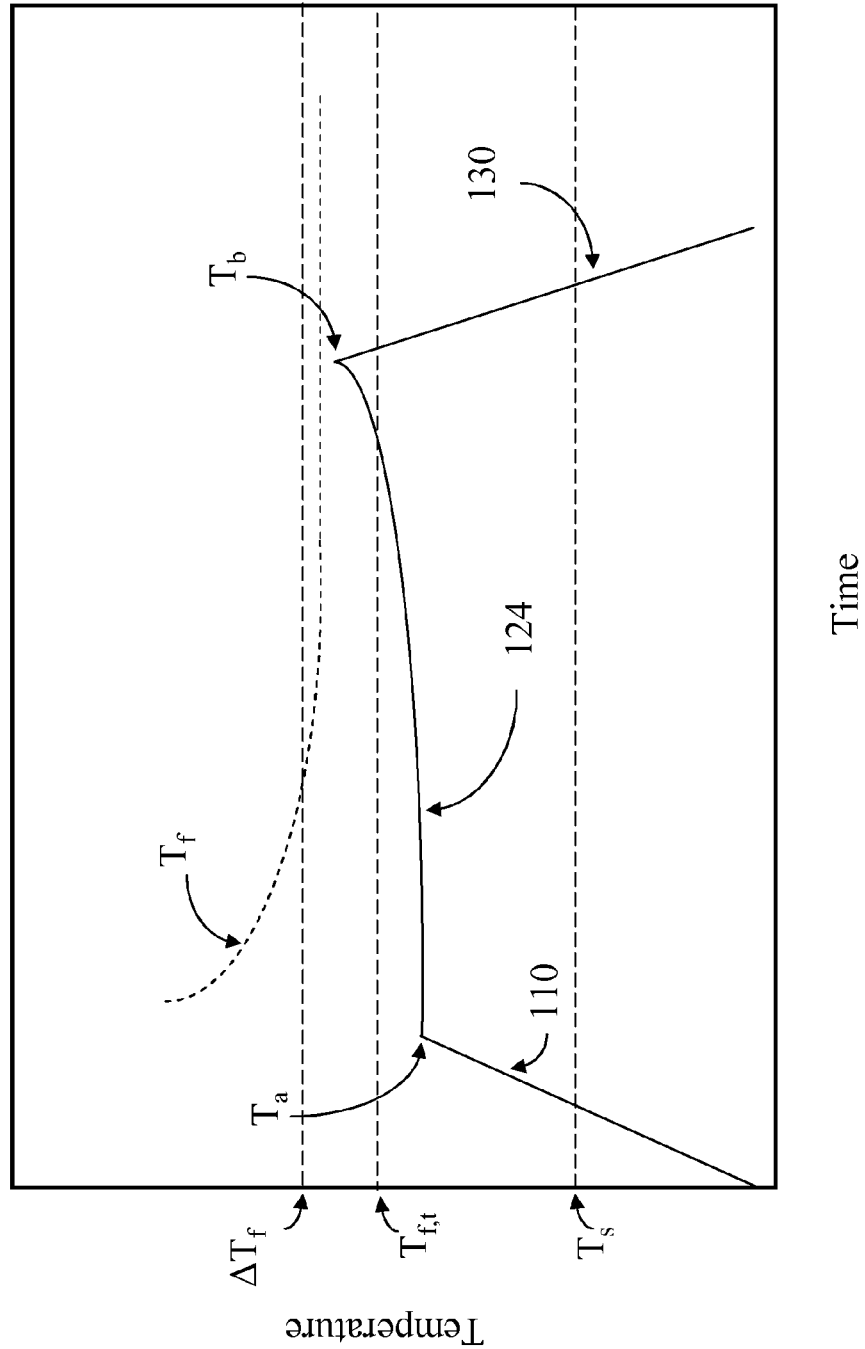
FIG. 1b is a schematic representation of an annealing schedule for silica glass in which the silica glass is heated from temperature $T_a$ to temperature $T_b$.
Figure 1C:
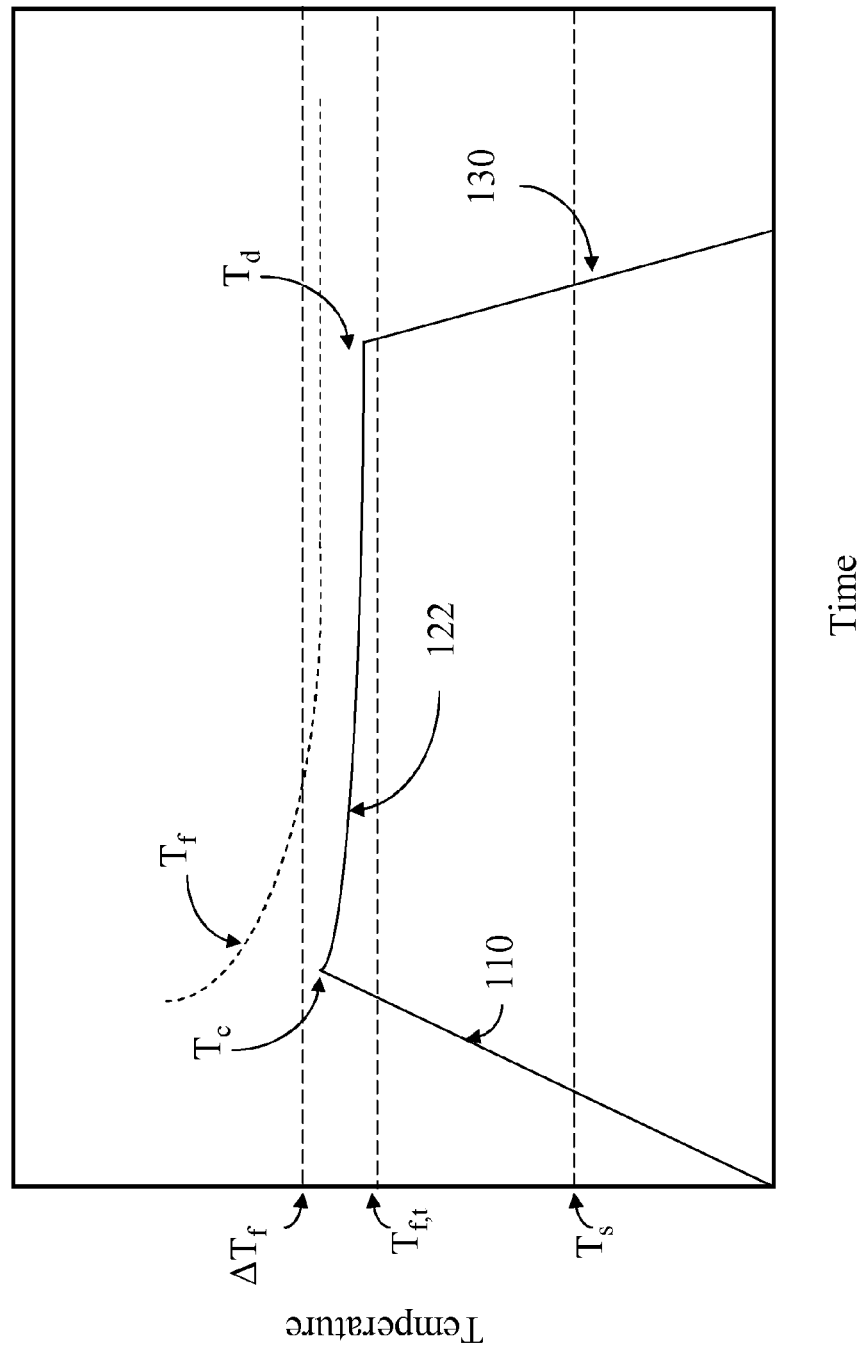
FIG. 1c is a schematic representation of an annealing schedule for silica glass in which the silica glass is cooled from temperature $T_c$ to temperature $T_d$.

In another embodiment, the glass is either heated or cooled from the desired temperature at a rate that is less than the rate of change of the fictive temperature $T_f$. FIG. 1b schematically shows a heating step 122 in which the glass is cooled from temperature $T_a$ to $T_b$, and FIG. 1c schematically shows a cooling step 124 in which the glass is cooled from temperature $T_c$ to $T_d$. The rate of change of the fictive temperature $T_f$ varies with the temperature of the glass. Similarly, the heating rate in this step depends at least in part on the temperature of the glass and is typically less than about 0.1° C./hr and, in some embodiments, less than about 0.05° C./hr. The glass is heated or cooled for a time period that is sufficiently long so as to allow the fictive temperatures $T_f$ of all glass volumes within the glass article to converge on the target fictive temperature $T_{f,t}$ and the isostructural state to be achieved, regardless of the local concentration of glass modifiers. In one embodiment, glass is heated or cooled for a time period that is sufficiently long so as to allow the fictive temperature $T_f$ to reach the target fictive temperature. In other embodiments, the fictive temperature $T_f$ varies from $T_{f,t}$ by $\Delta T_f$. In one embodiment, the fictive temperature of the glass varies from $T_{f,t}$ by less than 3° C. In another embodiment the fictive temperature of the glass varies from $T_{f,t}$ by less than 2° C. and, in a third embodiment, the fictive temperature varies from $T_{f,t}$ by less than 1° C. The glass is heated or cooled for a time period that is based on the desired degree of structural homogeneity, the initial variation or "spread" of fictive temperatures in the glass article, the variations in local concentrations of modifiers, and the previous thermal history of the glass article. In one embodiment, the glass is heated or cooled for a time period that is in a range from about 10 hours up to about 800 hours.

Once the isostructural state has been achieved, the glass is cooled (step 130) to a temperature below the strain point $T_s$ (i.e., the temperature at which a glass has a viscosity of $10^{14.5}$ Poise) at a rate that is sufficiently high so as to prevent differential structural changes from taking place in the glass. In one embodiment, the glass is cooled to a temperature that is less than 100° C. below the temperature of isothermal hold period 120 or the target fictive temperature $T_{f,t}$. The cooling rate in step 130 is greater than the relaxation rate (τ); i.e., the rate at which the fictive temperature of the glass changes or "relaxes." In other words, the glass is cooled at a rate that is greater than the rate at which the fictive temperature and the structure of the glass are capable of changing. Consequently, the fictive temperature and isostructural state of the glass do not appreciably change during cooling Step 130. The relaxation rate is typically about 1° C./hr, whereas the cooling rate in Step 130 is greater than 5° C./hr. In one embodiment, the cooling rate is greater than 10° C./hr and, in another embodiment, the cooling rate is greater than 30° C./hr.

Figure 2B:
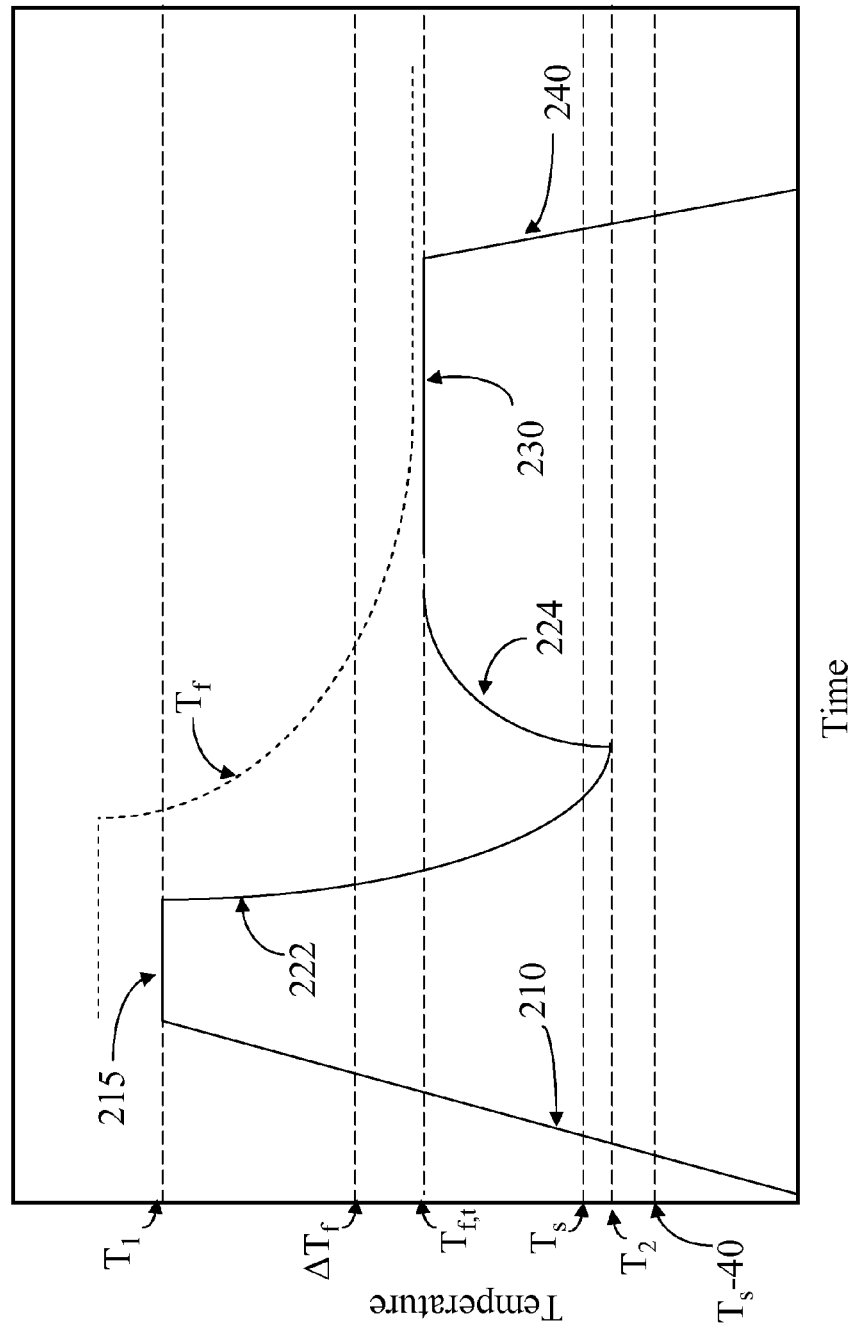
FIG. 2b is a schematic representation of a third annealing schedule for silica glass.

In one embodiment, schematically represented in FIG. 2, the glass is first heated in step 210 to a first temperature $T_1$ that is greater than the target fictive temperature $T_{f,t}$. The actual heating rate for first heating step 210 is not critical, and the glass can be heated in first heating step 210 to temperature $T_1$ as quickly as possible (in some embodiments at a rate of hundreds of degrees Celsius per hour). In one embodiment, the glass is held at $T_1$ for a first hold period 215, which serves to "erase" or remove any prior thermal history of the glass and has a length that is sufficient to remove the thermal history. The structure of the glass at the end of first hold period 215 is in a state that is independent of any previous heat treatments, such as, but not limited to, previous annealing or high temperature working steps performed on the glass article. In one embodiment, first hold period 215 has a length that is sufficient to allow the entire glass article to acquire a fictive temperature $T_f$ that is within about 3° C. of first temperature $T_1$. In another embodiment, first hold period is greater than five times the structural relaxation time constant of the glass at first temperature $T_1$.

First hold period 215 can also be used in those instances where the distribution of fictive temperatures throughout the glass is broad. Here the hold at the target fictive temperature $T_{f,t}$ (120 in FIG. 1, 230 in FIG. 2a) needed to achieve the desired fictive temperature distribution to within the desired range of $T_{f,t}$ would be so long so as to be impractical in the manufacture of the glass. First hold period 215 thus serves to initiate the decrease in fictive temperature and approach of $T_f$ to within the desired range of $T_{f,t}$.

Following first hold period 215, the glass article, in one embodiment, is cooled to the target fictive temperature $T_{f,t}$. In one embodiment, the glass is cooled from the first temperature $T_1$ to the target fictive using cooling step 220. During cooling step 220, the glass is cooled at a rate that is sufficiently low to allow the fictive temperature $T_f$ to approach or come within 5° C. to 20° C. of the target fictive temperature $T_{f,t}$. In one embodiment, the glass is cooled from first temperature $T_1$ at a rate that is sufficiently slow so as to permit portions of the glass to re-order so as to achieve the isostructural state. In a particular embodiment, the cooling rate in cooling step 220 is less than about 0.05° C./hr.

In another embodiment, the glass is first cooled to a second temperature $T_2$ (step 222). Second temperature $T_2$ is less than the target fictive temperature $T_{f,t}$ and greater than a temperature that is 40° C. below the strain point $T_s$ of the glass; i.e., $T_2 > T_s - 40°$ C. The cooling rate in step 222 is sufficiently slow so as to permit portions of the glass to re-order and achieve the isostructural state. In a particular embodiment, the cooling rate in cooling step 220 is less than about 0.05° C./hr. After reaching second temperature $T_2$, the glass is then heated to the target fictive temperature $T_{f,t}$ (Step 224) at a heating rate that is sufficiently low to allow portions of the glass to re-order and achieve the isostructural state. In one embodiment, the heating rate in heating step 224 is sufficiently low to allow the fictive temperature $T_f$ to approach or come within 5° C. to 20° C. of the target fictive temperature $T_{f,t}$.

After heating to $T_{f,t}$, the glass, in one embodiment, undergoes an isothermal hold period 230 at $T_{f,t}$. The length of isothermal hold period 230 is a time that is sufficient for the fictive temperature $T_f$ of the glass to approach the target fictive temperature $T_{f,t}$. In one embodiment, isothermal hold period 230 is sufficiently long so as to allow the fictive temperature to reach the target fictive temperature. In other embodiments, the fictive temperature $T_f$ varies from $T_{f,t}$ by $\Delta T_f$. In one embodiment, the fictive temperature $T_f$ of the glass varies from $T_{f,t}$ by less than 3° C. In another embodiment the fictive temperature of the glass varies from $T_{f,t}$ by less than 2° C. and, in a third embodiment, the fictive temperature varies from $T_{f,t}$ by less than 1° C.

In another embodiment, the glass, rather than being held at or near target fictive temperature $T_{f,t}$, is either heated or cooled from a selected temperature at a rate that is less than the rate of change of the fictive temperature $T_f$. The glass is heated or cooled for a time period that is sufficiently long so as to allow the fictive temperatures $T_f$ of all glass volumes within the glass article to converge on the target fictive temperature $T_{f,t}$ and the isostructural state to be achieved, regardless of the local concentration of glass modifiers.

Once the isostructural state and/or desired fictive temperature has been achieved in isothermal hold period 230, the glass is cooled (step 240) to a temperature below the strain point $T_s$ at a rate that is sufficiently high so as to prevent differential structural changes from taking place in the glass. In one embodiment, the glass is cooled to a temperature that is less than 100° C. below the temperature of isothermal hold 230. The cooling rate in Step 240 is greater than the relaxation rate; i.e., the rate at which the fictive temperature of the glass cools or "relaxes." In other words, the glass is cooled at a rate that is greater than the rate at which the fictive temperature and the structure of the glass are capable of changing. Consequently, the fictive temperature and isostructural state of the glass do not appreciably change during cooling Step 240. The relaxation rate is typically about 1° C./hr, whereas the cooling rate in Step 240 is greater than 5° C./hr. In one embodiment, the cooling rate is greater than 10° C./hr and, in another embodiment, the cooling rate is greater than 30° C./hr.

In some embodiments, the glass is cooled from first temperature $T_1$ to either the target fictive temperature $T_{f,t}$ (step 220 in FIG. 2a) or the second temperature $T_2$ (step 222 in FIG. 2b) at a progressively decreasing cooling rate. The progressively decreasing cooling rate is typically non-linear, comprising multiple cooling steps in which the cooling rate is decreased from one step to the next. A progressively decreasing cooling rate is schematically shown in FIG. 3a. The progressively decreasing cooling rate, for example, includes a first cooling step 310 in which the silica glass is cooled from a first temperature $T_a$ to a second temperature $T_b$ at a first cooling rate $r_a$, then to a third temperature $T_c$ at a second cooling rate $r_b$ (second cooling step 312), then to a fourth temperature $T_d$ at a third cooling rate $r_c$ (third cooling step 314), and finally to a fifth temperature $T_e$ at a fourth cooling rate $r_d$ (fourth cooling step 316), wherein $T_a > T_b > T_c > T_d > T_e$ and $r_a > r_b > r_c > r_d$. The progressively decreasing cooling rate is not limited to the number of cooling steps described above and can include any number of cooling steps in which the cooling rate is progressively decreased.

The progressively decreasing cooling rate is less than the optimum anneal rate of the silica glass. As used herein, the term "optimal anneal rate" is the s the annealing or cooling rate at which the change in fictive temperature $T_f$ with respect to time t (i.e., $dT_f/dt$) assumes a local maximum value. The silica glass is cooled at a rate such that the difference between the temperature T and the fictive temperature $T_f$ of the silica glass is less than a predetermined optimal value and within a predetermined range of the optimal value.

In some embodiments, the glass is heated from second temperature $T_2$ to the target fictive temperature $T_{f,t}$ (step 224 in FIG. 2b) at a progressively decreasing heating rate. As with the progressively decreasing cooling rate described above, the progressively decreasing heating rate is typically non-linear and comprises multiple heating steps in which the heating rate is decreased from one step to the next. A progressively decreasing heating rate is schematically shown in FIG. 3b. The progressively decreasing heating rate, for example, includes a first heating step 320 in which the silica glass is heated from a first temperature $T_k$ to a second temperature $T_j$ at first heating rate $r_k$, then to a third temperature $T_i$ at a second heating rate $r_j$ (second heating step 322), then to a fourth temperature $T_h$ at a third heating rate $r_i$ (third heating step 324), and finally to a fifth temperature $T_g$ at a heating rate $r_h$ (fourth heating step 326), wherein $T_k < T_j < T_i < T_h < T_g$ and $r_k > r_j > r_i > r_h$. The progressively decreasing heating rate is not limited to the number of heating steps described above and can include any number of heating steps in which the heating rate is progressively decreased.

The progressively decreasing heating rate is less than the optimum anneal rate of the silica glass. The silica glass is heated at a rate such that the difference between the temperature T and the fictive temperature $T_f$ of the silica glass is less than a predetermined optimal value and within a predetermined range of the optimal value.

The progressively decreasing cooling and progressively decreasing heating rates described herein are based upon experimental data obtained from samples having low hydroxyl concentrations and numerically modeled data.

The evolution of structural homogeneity in silica glass as the glass relaxes through an annealing cycle to a structure that is characterized by a low fictive temperature can be followed using an empirical model described in U.S. Provisional Patent Application No. 61/141,924, filed on Dec. 31, 2008, by Carlos Duran et al., entitled "High Purity Fused Silica with Low Absolute Refractive Index," the contents of which are incorporated herein by reference in their entirety. The model is based on the premise that a glass having a structure characterized by a fictive temperature $T_f$ will, when held at a temperature T, relax by changing its $T_f$ so that the fictive temperature $T_f$ approaches temperature T. Further, the model assumes that the relaxation is of the form:

$$T_f(t) = T + (T_f(0) - T) \cdot \exp(-t/\tau) \quad (1)$$

where t is the time elapsed since the glass was brought to temperature T, and $T_f(0)$ is the glass $T_f$ at that instant. The model also assumes that the relaxation is characterized by a time constant $\tau$. For a glass having a given composition, time constant $\tau$ is a function of only the temperature T, and not a function of the fictive temperature $T_f$. The time constant $\tau$ is assumed to depend on T through the temperature dependence of the glass viscosity $\nu$:

$$\tau(T) = \nu(T)/\alpha \quad (2)$$

where $\alpha$ is a material-specific, temperature independent parameter. The glass viscosity $\nu$ can be measured by independent techniques known in the art such as, for example, beam bending and parallel plate techniques. Alternatively, the temperature dependence of the viscosity can be determined experimentally by annealing glass samples at prescribed uniform rates of cooling.

Glasses usually exhibit a viscosity that is strongly temperature dependent. The viscosity can generally be approximated by an exponential of the form:

$$\nu(T) = \exp(a + b/T) \quad (3)$$

where a and b are parameters obtained empirically from fitting experimental data. The strong temperature dependence of the viscosity directly translates into an equally strong dependence of the relaxation rate $\tau(T)$. In practical terms, this means that the rate of change of fictive temperature $T_f$ during the typical temperature range used in a normal annealing process can vary by several orders of magnitude. Thus, in order to obtain low $T_f$ within a timeframe that is practical for a glass manufacturing process, the annealing schedule must take this variation into account.

EXAMPLES

The following examples illustrate the features and advantages of the silica glass and methods disclosed herein, and are in no way intended to limit the disclosure or the appended claims.

Each of the samples described herein were made by the soot-to-glass deposition process via chemical combustion of octamethyltreacylcosiloxane (OMCTS) and deposition of the soot on a fused silica mandrel or "cane" to form a preform. The preform was consolidated to yield the desired hydroxyl or deuteroxyl levels in the glass and then mechanically worked by squash and roll-out processes known in the art.

Figure 4:
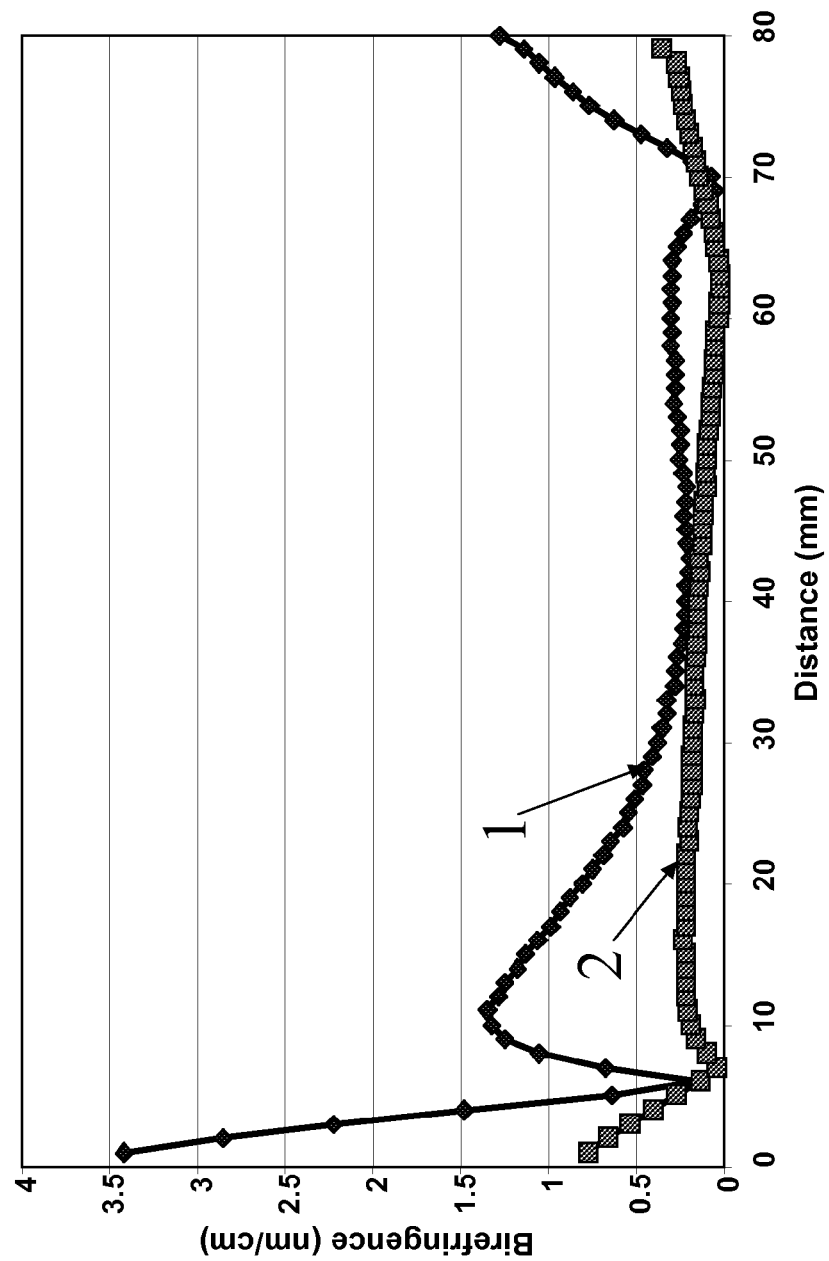
FIG. 4 is a plot of birefringence of a silica glass sample before (1) and after (2) annealing.
Figure 5:
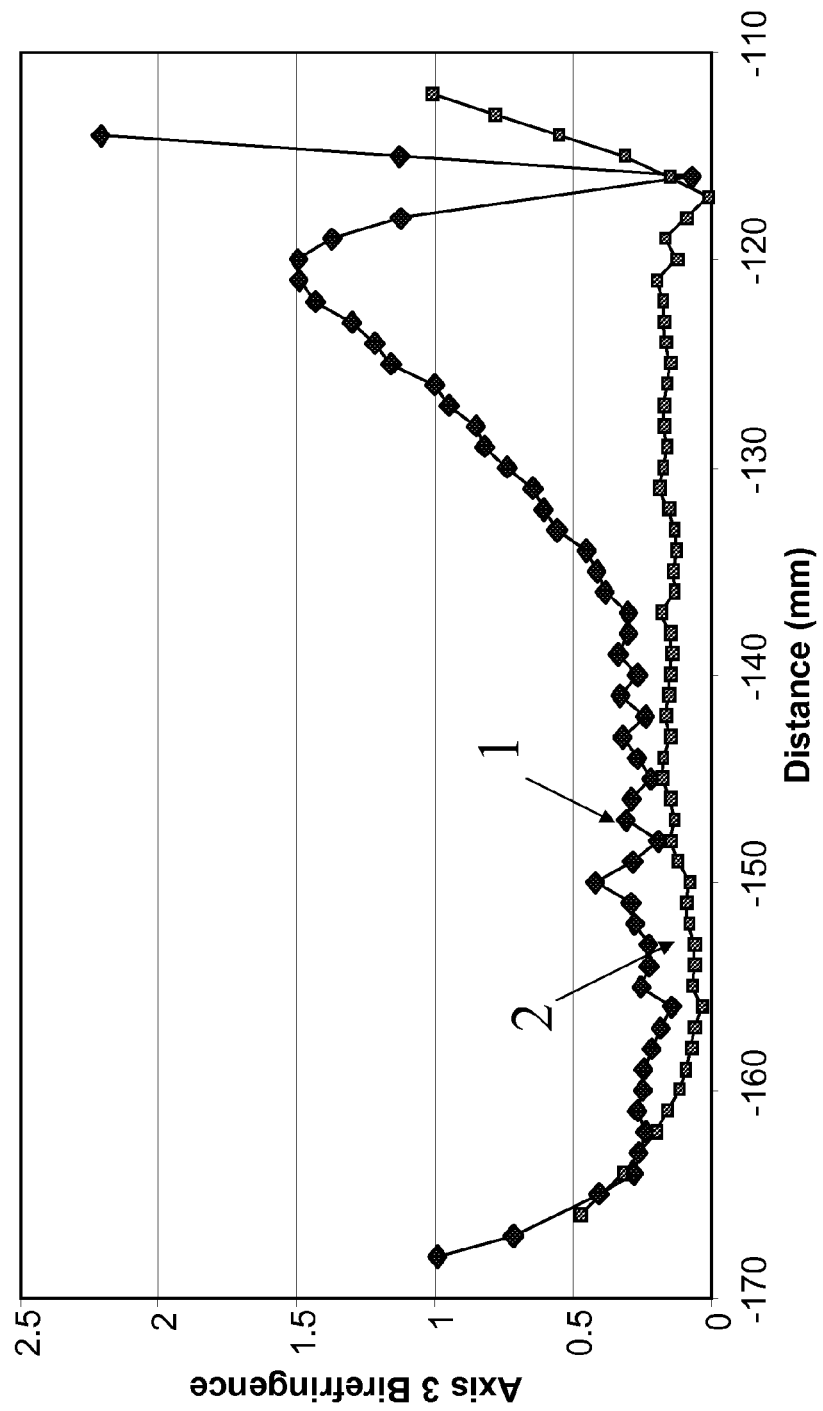
FIG. 5 is a plot of birefringence of a second silica glass sample before (1) and after (2) annealing.

The glass samples were first annealed according to a standard process, the schedule of which is described in Table 1. The resulting glass was then annealed according to the methods described herein (homogenization anneal), the schedule for which is described in Table 2. With the exception of initial ramps and/or holds or "soaks" at temperatures of less than or equal to 200° C., both annealing schedules were carried out in purging atmospheres consisting of either nitrogen or nitrogen and less than 20% chlorine. Index homogeneity (determined from peak to valley (PV) measurements) and/or birefringence before and after the annealing process described herein were determined for the samples studied. The results of these measurements, which are listed in Table 3, show that, in each sample, the annealing method described herein decreases the index homogeneity and/or birefringence of the glass. Plots of birefringence of samples 4 and 5 as a function of position along sample axis 3 before (1), and after (2) the annealing process described herein are shown in FIGS. 4 (sample 3) and 5 (sample 5), respectively. In both instances the birefringence of the glass decreases following the annealing process. In addition, the birefringence exhibits less variation as a function of position along a given axis.

TABLE 1

Standard anneal schedule.

| Step no. | Step | Temperature (° C.) Initial | Temperature (° C.) Final | Rate (° C./hr) | Time (minutes) |
|---|---|---|---|---|---|
| 1 | Ramp | 25 | 200 | 200 | 53 |
| 2 | Soak | 200 | 200 | | 15 |
| 3 | Soak/backfill | 200 | 200 | | 7 |
| 4 | Ramp/backfill | 200 | 1200 | 300 | 200 |
| 5 | Ramp | 1200 | 1225 | 50 | 30 |
| 6 | Soak | 1225 | 1225 | | 240 |
| 7 | Ramp | 1225 | 1150 | −5 | 900 |
| 8 | Ramp | 1150 | 1125 | −5 | 300 |
| 9 | Ramp | 1125 | 1100 | −2.5 | 600 |
| 10 | Ramp | 1100 | 1075 | −1 | 1500 |
| 11 | Ramp | 1075 | 1060 | −0.5 | 1800 |
| 12 | Ramp | 1060 | 1016 | −0.4 | 6600 |
| 13 | Ramp | 1016 | 800 | −30 | 432 |
| 14 | Cooling | 800 | 500 | −80 | 225 |
| 15 | Cooling | 500 | 50 | −40 | 675 |

TABLE 2

Homogenization anneal schedule for method described herein.

| Step no. | Step | Temperature (° C.) Initial | Temperature (° C.) Final | Rate (° C./hr) | Time (minutes) |
|---|---|---|---|---|---|
| 1 | Ramp | 25 | 200 | 200 | 53 |
| 2 | Soak | 200 | 200 | 0 | 15 |
| 3 | Soak/backfill | 200 | 200 | 0 | 7 |
| 4 | Ramp/backfill | 200 | 900 | 300 | 140 |
| 5 | Ramp | 900 | 1000 | 100 | 60 |
| 6 | Ramp | 1000 | 1030 | 30 | 60 |
| 7 | Ramp | 1030 | 1055 | 10 | 240 |
| 8 | Ramp | 1055 | 1058 | 5 | 36 |
| 9 | Ramp | 1058 | 1060 | 2 | 60 |
| 10 | Soak | 1060 | 1060 | 0 | 5760 |
| 11 | Ramp | 1060 | 800 | −30 | 520 |
| 12 | Cooling | 800 | 500 | −300 | 60 |
| 13 | Cooling | 500 | 50 | −300 | 90 |

TABLE 3

Index homogeneity and birefringence before and after the anneal described herein.

| Sample | OH, Na content (ppm) | Index homogeneity (ppm) Before anneal | Index homogeneity (ppm) After anneal | Birefringence (nm/cm) Before anneal | Birefringence (nm/cm) After anneal |
|---|---|---|---|---|---|
| 1 | 60 ppm | 1.74 | 1.5 | 0.36 | 0.35 |
| 2 | 60 ppm | | | 0.35 | 0.175 |
| 3 | 1-2 ppm OD, <1 ppm OH (protium) | 0.63 | 0.54 | 0.41 | 0.39 |
| 4 | 60 ppm OD | 3.55 | 1.76 | 1.1 | 0.55 |
| 5 | <2 ppm OD, 2-21 ppb Na | 2.3 | 0.9 | 0.28 | 0.189 |
| 6 | 1-5 ppm OD | — | — | 0.75 | 0.41 |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method of making a silica glass having a uniform fictive temperature, the method comprising the steps of:
    a. providing the silica glass, the silica glass having a strain point $T_s$, a fictive temperature $T_f$ and a relaxation rate at the fictive temperature $T_f$, wherein the silica glass has a hydroxyl concentration that varies by at least 0.5 ppm; and
    b. annealing the silica glass, wherein annealing the silica glass comprises:
        i. heating the silica glass to a first temperature that is greater than target fictive temperature $T_{f,t}$, cooling the glass to a second temperature that is less than the target fictive temperature $T_{f,t}$ and greater than $T_s$-40° C., and heating the silica glass from the second temperature to the target fictive temperature $T_{f,t}$, at a progressively decreasing heating rate that is less than a rate of change of the fictive temperature $T_f$ for a time sufficient for the fictive temperature $T_f$ of the silica glass to come within 3° C. of the target fictive temperature $T_{f,t}$; and
        ii. cooling the silica glass from the target fictive temperature $T_{f,t}$ to a temperature below the strain point $T_s$ at a cooling rate that is greater than the relaxation rate of the glass at the target fictive temperature $T_{f,t}$, wherein the silica glass has a fictive temperature $T_f$ that varies by less than 3° C. after the annealing step.

2. The method of claim 1, wherein the silica glass comprises up to about 25 ppb sodium.

3. The method of claim 1, wherein the silica glass has a hydroxyl group concentration of less than 800 ppm by weight.

4. The method of claim 1, wherein the fictive temperature after the silica glass is cooled from the target fictive temperature to the temperature below the strain point is less than 1065° C.

5. The method of claim 1, wherein the silica glass has an index homogeneity of less than 1 ppm after annealing.

6. The method of claim 1, wherein the silica glass has an absolute refractive index of less than 1.560830 at a wavelength of 193.368 nm and a temperature of 22° C.

7. The method of claim 1, wherein the silica glass has a birefringence of less than 3 nm/cm.

8. The method of claim 1, wherein holding the silica glass at the target fictive temperature comprises holding the silica glass at the target fictive temperature for a time in a range from about 10 hours up to about 800 hours.

9. The method of claim 1, wherein the silica glass is cooled from the target fictive temperature to the temperature below the strain point at a rate of greater than about 5° C./hr.

10. The method of claim 1, wherein the hydroxyl concentration includes deuteroxyl groups, and wherein the deuteroxyl groups are present in a concentration that is greater that the natural isotopic abundance of deuterium.

11. A method of obtaining a uniform fictive temperature in a silica glass, the method comprising the steps of:
    a. providing the silica glass, the silica glass having a strain point $T_s$, a fictive temperature $T_f$, and a relaxation rate at the fictive temperature $T_f$; and
    b. annealing the silica glass, wherein annealing the silica glass comprises:
        i. heating the silica glass to a first temperature that is greater than target fictive temperature $T_{f,t}$, cooling the glass to a second temperature that is less than the target fictive temperature $T_{f,t}$ and greater than $T_s$-40° C., and heating the silica glass from the second temperature to the target fictive temperature $T_{f,t}$ at a progressively decreasing heating rate that is less than a rate of change of the fictive temperature $T_f$ for a time sufficient for the fictive temperature $T_f$ of the silica glass to come within 3° C. of the target fictive temperature $T_{f,t}$; and ii. cooling the silica glass from the target fictive temperature to a temperature below the strain point at a cooling rate that is greater than the relaxation rate of the glass at the target fictive temperature, wherein the silica glass has a fictive temperature that varies by less than 3° C. after the annealing step.

12. The method of claim 11, wherein the step of heating the silica glass to the target fictive temperature at a progressively decreasing heating rate comprises heating the silica glass such that a difference $T_f$-T between the fictive temperature $T_f$ of the silica glass and the temperature T at any point during heating of the silica glass is less than a predetermined optimal difference between the fictive temperature $T_f$ of the silica glass and the temperature T of the silica glass at any point during heating and within a predetermined range of the optimal difference.

13. The method of claim 11, wherein the silica glass comprises up to about 25 ppb sodium.

14. The method of claim 11, wherein the fictive temperature after the silica glass is cooled from the target fictive temperature to the temperature below the strain point is less than 1065° C.

15. The method of claim 11, wherein the silica glass has a hydroxyl group concentration of less than 800 ppm by weight.

16. The method of claim 15, wherein the hydroxyl group concentration varies by at least 0.5 ppm.

17. The method of claim 11, wherein the silica glass has an index homogeneity of less than 1 ppm after annealing.

18. The method of claim 11, wherein the silica glass has an absolute refractive index of less than 1.560830 at a wavelength of 193.368 nm and a temperature of 22° C.

19. The method of claim 11, wherein the silica glass has a birefringence of less than 3 nm/cm.

20. The method of claim 11, wherein holding the silica glass at the target fictive temperature comprises holding the silica glass at the target fictive temperature for a time in a range from about 10 hours up to about 800 hours.

21. The method of claim 11, wherein the silica glass is cooled from the target fictive temperature to the temperature below the strain point at a rate of greater than about 5° C./hr.

22. A method of annealing a silica glass, the method comprising the steps of:
a. providing the silica glass, the silica glass having a strain point $T_s$, a fictive temperature $T_f$, and a relaxation rate at the fictive temperature $T_f$; and
b. annealing the silica glass, wherein annealing the silica glass comprises:
i. heating the silica glass to a first temperature that is greater than target fictive temperature $T_{f,t}$, cooling the glass to a second temperature that is less than the target fictive temperature $T_{f,t}$ and greater than $T_s$-40° C., and heating the silica glass from the second temperature to the target fictive temperature $T_{f,t}$ at a progressively decreasing heating rate that is less than a rate of change of the fictive temperature $T_f$ for a time sufficient for the fictive temperature $T_f$ of the silica glass to come within 3° C. of the target fictive temperature $T_{f,t}$; and ii. cooling the silica glass from the target fictive temperature to a temperature below the strain point at a cooling rate that is greater than the relaxation rate of the glass at the target fictive temperature, wherein the silica glass has a fictive temperature that varies by less than 3° C. after the annealing step.

23. The method of claim 22, wherein the step of heating the silica glass to the target fictive temperature at a progressively decreasing heating rate comprises heating the silica glass such that a difference $T_f$-T between the fictive temperature $T_f$ of the silica glass and the temperature T at any point during heating of the silica glass is less than a predetermined optimal difference between the fictive temperature $T_f$ of the silica glass and the temperature T of the silica glass at any point during heating and within a predetermined range of the optimal difference.

24. The method of claim 22, wherein the fictive temperature after the silica glass is cooled from the target fictive temperature to the temperature below the strain point is less than 1065° C.

25. The method of claim 22, wherein the silica glass has an index homogeneity of less than 1 ppm after annealing.

26. The method of claim 22, wherein the silica glass has a birefringence of less than 3 nm/cm.

27. The method of claim 22, wherein holding the silica glass at the target fictive temperature comprises holding the silica glass at the target fictive temperature for a time in a range from about 10 hours up to about 800 hours.

28. The method of claim 22, wherein the silica glass is cooled from the target fictive temperature to the temperature below the strain point at a rate of greater than about 5° C./hr.

29. A method of making a silica glass having a uniform fictive temperature, the method comprising:
a. providing the silica glass, the silica glass hang a strain point $T_s$, a fictive temperature, and a relaxation rate at the fictive temperature, wherein the silica glass has a hydroxyl concentration that varies by at least 0.5 ppm; and
b. annealing the silica glass, wherein annealing the silica glass comprises:
i. heating the silica glass to a first temperature that is greater than a target fictive temperature;
ii. cooling the silica glass to a second temperature that is less than the target fictive temperature and greater than Ts-40° C.; and
iii. heating the silica glass from the second temperature to the target fictive temperature to come within 20° C. of the target fictive temperature; and
c. cooling the silica glass from the target fictive temperature to a temperature below the strain point at a cooling rate that is greater than the relaxation rate of the silica glass at the target fictive temperature, wherein the silica glass has a fictive temperature that varies by less than 3° C. after the annealing step.

30. A method of making a silica glass having a uniform fictive temperature, the method comprising:
a. providing the silica glass, the silica glass hang a strain point $T_s$, a fictive temperature, and a relaxation rate at the fictive temperature, wherein the silica glass has a hydroxyl concentration that varies by at least 0.5 ppm; and
b. annealing the silica glass, wherein annealing the silica glass comprises:
i. heating the silica glass to a first temperature that is greater than a target fictive temperature;

ii. cooling the silica glass to the target fictive temperature at a rate of less than 0.05° C./hr to come within 20° C. of the target fictive temperature.

31. A method of obtaining a uniform fictive temperature in a silica glass, the method comprising:
   a. providing the silica glass, the silica glass hang a strain point $T_s$, a fictive temperature, and a relaxation rate at the fictive temperature, wherein the silica glass has a hydroxyl concentration that varies by at least 0.5 ppm; and
   b. annealing the silica glass, wherein annealing the silica glass comprises:
      i. heating the silica glass to a first temperature that is greater than a target fictive temperature;
      ii. cooling the silica glass to a second temperature that is less than the target fictive temperature and greater than Ts-40° C.; and
      iii. heating the silica glass from the second temperature to the target fictive temperature to come within 20° C. of the target fictive temperature; and
   c. cooling the silica glass from the target fictive temperature to a temperature below the strain point at a cooling rate that is greater than the relaxation rate of the silica glass at the target fictive temperature, wherein the silica glass has a fictive temperature that varies by less than 3° C. after the annealing step.

32. A method of annealing a silica glass, the method comprising:
   a. providing the silica glass, the silica glass hang a strain point $T_s$, a fictive temperature, and a relaxation rate at the fictive temperature, wherein the silica glass has a hydroxyl concentration that varies by at least 0.5 ppm; and
   b. annealing the silica glass, wherein annealing the silica glass comprises:
      i. heating the silica glass to a first temperature that is greater than a target fictive temperature;
      ii. cooling the silica glass to a second temperature that is less than the target fictive temperature and greater than Ts-40° C.; and
      iii. heating the silica glass from the second temperature to the target fictive temperature to come within 20° C. of the target fictive temperature; and
   c. cooling the silica glass from the target fictive temperature to a temperature below the strain point at a cooling rate that is greater than the relaxation rate of the silica glass at the target fictive temperature, wherein the silica glass has a fictive temperature that varies by less than 3° C. after the annealing step.

33. A method of annealing a silica glass, the method comprising:
   a. providing the silica glass, the silica glass hang a strain point $T_s$, a fictive temperature, and a relaxation rate at the fictive temperature, wherein the silica glass has a hydroxyl concentration that varies by at least 0.5 ppm; and
   b. annealing the silica glass, wherein annealing the silica glass comprises:
      i. heating the silica glass to a first temperature that is greater than a target fictive temperature;
      ii. cooling the silica glass to the target fictive temperature at a rate of less than 0.05° C./hr to come within 20° C. of the target fictive temperature.

34. The method of claim 29, wherein the silica glass has a hydroxyl group concentration of less than 800 ppm by weight.

35. The method of claim 29, wherein the silica glass has an index homogeneity of less than 1 ppm after annealing.

36. The method of claim 29 wherein the fictive temperature after the silica glass is cooled from the target fictive temperature to the temperature below the strain point is less than 1065° C.

37. The method of claim 29, wherein the hydroxyl concentration includes deuteroxyl groups, and wherein the deuteroxyl groups are present in a concentration that is greater that the natural isotopic abundance of deuterium.

38. The method of claim 30, wherein the silica glass has a hydroxyl group concentration of less than 800 ppm by weight.

39. The method of claim 30, wherein the silica glass has an index homogeneity of less than 1 ppm after annealing.

40. The method of claim 30, wherein the fictive temperature after the silica glass is cooled from the target fictive temperature to the temperature below the strain point is less than 1065° C.

41. The method of claim 30, wherein the hydroxyl concentration includes deuteroxyl groups, and wherein the deuteroxyl groups are present in a concentration that is greater that the natural isotopic abundance of deuterium.

42. The method of claim 31, wherein the silica glass has a hydroxyl group concentration of less than 800 ppm by weight.

43. The method of claim 31, wherein the silica glass has an index homogeneity of less than 1 ppm after annealing.

44. The method of claim 31, wherein the fictive temperature after the silica glass is cooled from the target fictive temperature to the temperature below the strain point is less than 1065° C.

45. The method of claim 31, wherein the hydroxyl concentration includes deuteroxyl groups, and wherein the deuteroxyl groups are present in a concentration that is greater that the natural isotopic abundance of deuterium.

46. The method of claim 32, wherein the silica glass has a hydroxyl group concentration of less than 800 ppm by weight.

47. The method of claim 32, wherein the silica glass has an index homogeneity of less than 1 ppm after annealing.

48. The method of claim 32, wherein the fictive temperature after the silica glass is cooled from the target fictive temperature to the temperature below the strain point is less than 1065° C.

49. The method of claim 32, wherein the hydroxyl concentration includes deuteroxyl groups, and wherein the deuteroxyl groups are present in a concentration that is greater that the natural isotopic abundance of deuterium.

50. The method of claim 33, wherein the silica glass has a hydroxyl group concentration of less than 800 ppm by weight.

51. The method of claim 33, wherein the silica glass has an index homogeneity of less than 1 ppm after annealing.

52. The method of claim 33, wherein the fictive temperature after the silica glass is cooled from the target fictive temperature to the temperature below the strain point is less than 1065° C.

53. The method of claim 33, wherein the hydroxyl concentration includes deuteroxyl groups, and wherein the deuteroxyl groups are present in a concentration that is greater that the natural isotopic abundance of deuterium.

* * * * *